United States Patent
Kwon et al.

(10) Patent No.: US 12,360,720 B2
(45) Date of Patent: Jul. 15, 2025

(54) IDENTIFICATION OF A ROOM AMONG PLURAL ROOMS WHERE A MOVABLE ELECTRONIC APPARATUS IS LOCATED AND/OR MOVING TO AND DISPLAY OF CONTENT GROUP CORRESPONDING TO THE IDENTIFIED ROOM

(71) Applicant: SAMSUNG ELECTRONICS CO., LTD., Suwon-si (KR)

(72) Inventors: Jina Kwon, Suwon-si (KR); Gamin Park, Suwon-si (KR); Kyunghwa Jung, Suwon-si (KR); Jangwon Seo, Suwon-si (KR); Sangjoon Lee, Suwon-si (KR); Kitae Kim, Suwon-si (KR); Byeongju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 18/082,852

(22) Filed: Dec. 16, 2022

(65) Prior Publication Data

US 2023/0117342 A1    Apr. 20, 2023

Related U.S. Application Data

(63) Continuation of application No. PCT/KR2021/007129, filed on Jun. 8, 2021.

(30) Foreign Application Priority Data

Jun. 16, 2020 (KR) .................. 10-2020-0072804

(51) Int. Cl.
*G06F 3/14* (2006.01)
*G06F 11/34* (2006.01)

(52) U.S. Cl.
CPC ........ *G06F 3/1415* (2013.01); *G06F 11/3438* (2013.01)

(58) Field of Classification Search
None
See application file for complete search history.

(56) References Cited

U.S. PATENT DOCUMENTS

| 8,952,779 B2 | 2/2015 | Sugaya |
| 9,646,145 B2 | 5/2017 | Vida et al. |

(Continued)

FOREIGN PATENT DOCUMENTS

| KR | 10-2010-0125561 | 12/2010 |
| KR | 10-2015-0040468 | 4/2015 |

(Continued)

OTHER PUBLICATIONS

International Search Report for PCT/KR2021/007129, mailed Oct. 6, 2021, 10 pages.

(Continued)

*Primary Examiner* — Hilina K Demeter
(74) *Attorney, Agent, or Firm* — NIXON & VANDERHYE P.C.

(57) ABSTRACT

A movable electronic apparatus is provided. The movable electronic apparatus includes: a display; a processor configured to: identify that the electronic apparatus is located in a first space among a plurality of spaces, display an image of a first content group including at least one piece of first content corresponding to the first space among a plurality of pieces of content on the display, identify that the electronic apparatus moves from the first space to a second space, and display an image of a second content group including at least one piece of second content corresponding to the identified second space on the display.

15 Claims, 15 Drawing Sheets

(56) References Cited

U.S. PATENT DOCUMENTS

| | | | |
|---|---|---|---|
| 10,091,623 B2* | 10/2018 | High | H04W 4/30 |
| 10,362,284 B2* | 7/2019 | Thompson | H04N 13/373 |
| 10,937,247 B1* | 3/2021 | Chuah | G06T 7/70 |
| 11,252,329 B1* | 2/2022 | Cier | H04N 23/53 |
| 2010/0269058 A1 | 10/2010 | Othmer et al. | |
| 2010/0317371 A1 | 12/2010 | Westerinen et al. | |
| 2011/0154200 A1 | 6/2011 | Davis et al. | |
| 2012/0303455 A1 | 11/2012 | Busch | |
| 2015/0332622 A1* | 11/2015 | Liu | G06Q 30/0256 |
| | | | 705/14.54 |
| 2016/0283089 A1 | 9/2016 | Han et al. | |
| 2017/0160882 A1* | 6/2017 | Park | G06F 3/0346 |
| 2017/0184410 A1* | 6/2017 | Zhang | H04W 4/029 |
| 2017/0329449 A1* | 11/2017 | Silverstein | G01S 13/56 |
| 2017/0336210 A1* | 11/2017 | Rahman | H04W 4/33 |
| 2018/0157377 A1 | 6/2018 | Popov et al. | |
| 2018/0239747 A1* | 8/2018 | Bills | H04W 4/08 |
| 2018/0313944 A1 | 11/2018 | Park et al. | |
| 2018/0343421 A1* | 11/2018 | Kahle | G01C 11/06 |
| 2018/0350144 A1* | 12/2018 | Rathod | G06Q 20/3224 |
| 2019/0121522 A1* | 4/2019 | Davis | G06V 40/28 |
| 2020/0034401 A1* | 1/2020 | Scannell, Jr. | G06F 16/9577 |

FOREIGN PATENT DOCUMENTS

| | | |
|---|---|---|
| KR | 10-2016-0133154 | 11/2016 |
| KR | 10-2017-0044419 | 4/2017 |
| KR | 10-2017-0125079 | 11/2017 |
| KR | 10-2020-0039625 | 4/2020 |
| WO | 2014/174523 | 10/2014 |
| WO | 2016/141248 | 9/2016 |

OTHER PUBLICATIONS

Written Opinion of the ISA for PCT/KR2021/007129, mailed Oct. 6, 2021, 4 pages.

Office Action for KR Application No. 10-2020-0072804 dated Jan. 15, 2025 and English translation, 8 pages.

\* cited by examiner

IDENTIFICATION OF A ROOM AMONG PLURAL ROOMS WHERE A MOVABLE ELECTRONIC APPARATUS IS LOCATED AND/OR MOVING TO AND DISPLAY OF CONTENT GROUP CORRESPONDING TO THE IDENTIFIED ROOM

CROSS-REFERENCE TO RELATED APPLICATIONS

This application is a continuation of International Application No. PCT/KR2021/007129 designating the United States, filed on Jun. 8, 2021, in the Korean Intellectual Property Receiving Office and claiming priority to Korean Patent Application No. 10-2020-0072804, filed on Jun. 16, 2020, in the Korean Intellectual Property Office, the disclosures of which are incorporated by reference herein in their entireties.

BACKGROUND

Field

The disclosure relates to an electronic apparatus that provides content, and a method of controlling the same.

Description of Related Art

A conventional electronic apparatus provides selected content or displays a set background image, but does not provide content varied depending on situations. Even when there is a plurality of electronic apparatuses, there are no functions of displaying images different according to the display apparatuses, and sharing compatible content between the plurality of apparatuses.

As technology related to a smart electronic apparatus, an electronic apparatus has recently been developed to recognize a user and provide functions suitable for the recognized user, or provide even a function varied depending on a user even though there are different users of a plurality of electronic apparatuses.

To use content conveniently and usefully, there is a need of developing technology that provides content more relevant to a situation beyond the function of providing content for each user, with increased needs for technology that provides content according to situations.

SUMMARY

Embodiments of the disclosure provide an electronic apparatus, which provides content more relevant to a situation, and a method of controlling the same.

According to an example embodiment of the disclosure, there is provided an movable electronic apparatus including: a display; a processor configured to: identify that the electronic apparatus is located in a first space among a plurality of spaces, control the display to display an image of a first content group including at least one piece of first content corresponding to the first space among a plurality of pieces of content on the display, identify that the electronic apparatus moves from the first space to a second space, and control the display to display an image of a second content group including at least one piece of second content corresponding to the identified second space on the display The processor may be configured to: obtain information about a space where the electronic apparatus is located and identify that the electronic apparatus moves from the first space to the second space based on the obtained information and reference information set corresponding to the plurality of spaces.

The processor may be configured to: control the display to display a graphic user interface (GUI) for setting the reference information, receive an input for setting the reference information through the displayed GUI, and set the reference information based on the received input.

The processor may be configured to: identify a user using the electronic apparatus among a plurality of users, and identify the content group corresponding to the identified user.

The processor may be configured to: identify an external device located within a specified proximity of the electronic apparatus, and identify a space where the electronic apparatus is located, based on a matching relationship between the identified external device and the plurality of spaces.

The processor may be configured to: identify a moving distance of the electronic apparatus, and identify a space where the electronic apparatus is located based on the identified moving distance.

The processor may be configured to: control the display to display a GUI for selecting any one among the plurality of spaces, receive an input for selecting a space where the electronic apparatus is located through the displayed GUI, and identify a space where the electronic apparatus is located, based on the received input.

The processor may be configured to: identify a content group corresponding to the identified space based on priority of content previously defined according to the plurality of spaces.

The processor may be configured to: identify a surrounding environment of the identified space, and control the display to display an image of the identified content group based on the identified surrounding environment.

The processor may be configured to: control the display to provide a GUI through which settings for an external device provided in the space may be changed, based on the identified surrounding environment.

The processor may be configured to: identify a use history of the electronic apparatus, and identify a content group corresponding to the identified space based on the identified use history of the electronic apparatus.

The processor may be configured to: control the display to display an image of first content corresponding to a first space identified as a space in which the electronic apparatus is located among a plurality of pieces of content based on the identified first space among the plurality of spaces, and the image of the first content and an image of a second content group corresponding to a second space, upon identifying that the electronic apparatus is located in the second space while displaying the image of the first content.

The processor may be configured to: identify a locational relationship between the electronic apparatus and a user within the identified space, and control the display to display an image of the identified content group, based on the identified locational relationship between the electronic apparatus and the user.

The processor may be configured to: control the display to display an image of the identified content group based on a distance between the electronic apparatus and the user.

According to an example embodiment of the disclosure, there is provided a method of controlling a movable electronic apparatus, the method including: identify that the electronic apparatus is located in a first space among a plurality of spaces; displaying an image of a first content group including at least one piece of first content corresponding to the first space among a plurality of pieces of content on a display; identifying that the electronic apparatus moves from the first space to a second space; and displaying an image of a second content group including at least one piece of second content corresponding to the identified second space on the display.

The identifying that the electronic apparatus moves from the first space to the second space may include: obtaining information about a space where the electronic apparatus is located and identifying that the electronic apparatus moves from the first space to the second space based on the obtained information and reference information set corresponding to the plurality of spaces.

The identifying that the electronic apparatus moves from the first space to the second space based on the obtained information and the reference information may include: controlling the display to display a graphic user interface (GUI) for setting the reference information, receiving an input for setting the reference information through the displayed GUI, and setting the reference information based on the received input.

The displaying the image of the second content group may include: identifying a user using the electronic apparatus among a plurality of users, and identifying the content group corresponding to the identified user.

The method may further include: identifying an external device located within a specified proximity of the electronic apparatus, and identifying a space where the electronic apparatus is located, based on a matching relationship between the identified external device and the plurality of spaces.

The method may further include: identifying a moving distance of the electronic apparatus, and identifying a space where the electronic apparatus is located, based on the identified moving distance.

The method may further include: displaying a GUI for selecting any one among the plurality of spaces on the display, receiving an input for selecting a space where the electronic apparatus is located through the displayed GUI, and identifying a space where the electronic apparatus is located based on the received input.

The displaying the image of the second content group may include: identifying a content group corresponding to the identified space based on priority of content previously defined according to the plurality of spaces.

The displaying the image of the second content group may include: identifying a surrounding environment of the identified space, and displaying an image of the identified content group based on the identified surrounding environment.

The displaying the image of the identified content group based on the identified surrounding environment may include: controlling the display to provide a GUI through which settings for an external device provided in the space may be changed, based on the identified surrounding environment.

The displaying the image of the second content group may include: identifying a use history of the electronic apparatus, and identifying a content group corresponding to the identified space based on the identified use history of the electronic apparatus.

The displaying the image of the second content group may include: controlling the display to display an image of first content corresponding to a first space in which the electronic apparatus is located among a plurality of pieces of content based on the identified first space among the plurality of spaces, and to display the image of the first content and an image of a second content group corresponding to a second space, upon identifying that the electronic apparatus is located in the second space while displaying the image of the first content.

The displaying the image of the second content group may include: identifying a locational relationship between the electronic apparatus and a user within the identified space, and controlling the display to display an image of the identified content group, based on the identified locational relationship between the electronic apparatus and the user.

The controlling the display to display the image of the identified content group may include: controlling the display to display an image of the identified content group based on a distance between the electronic apparatus and the user.

According to an example embodiment of the disclosure, there is provided a non-transitory computer-readable recording medium in which a computer program including a code which, when executed by a processor of an electronic device, causes the electronic device to perform operations including: identify that the electronic apparatus is located in a first space among a plurality of spaces; displaying an image of a first content group, including at least one piece of first content corresponding to the first space among a plurality of pieces of content, on a display; identifying that the electronic apparatus moves from the first space to a second space; and displaying an image of a second content group, including at least one piece of second content corresponding to the identified second space, on the display.

According to various example embodiments of the disclosure, a movable electronic apparatus is freely changeable according to spaces and provides an image relevant to a situation to a user, thereby improving the user's utility of the electronic apparatus.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
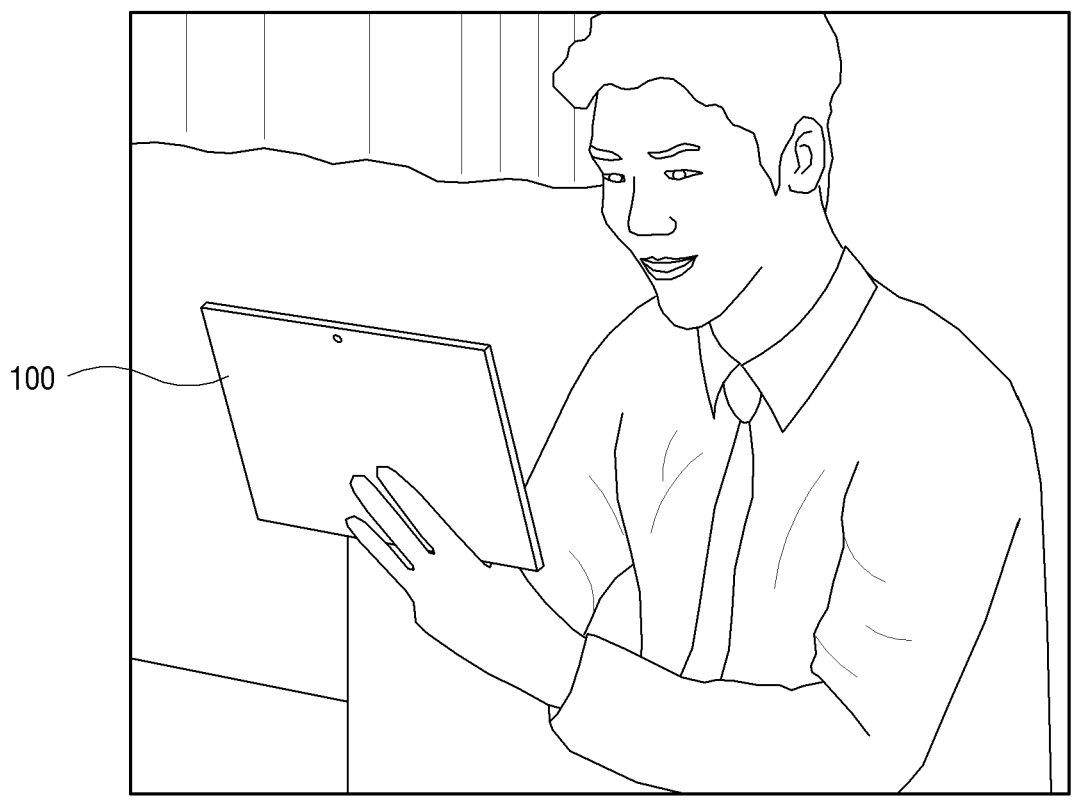
FIG. 1 is a diagram illustrating an example electronic apparatus according to various embodiments.

Below, various example embodiments will be described in greater detail with reference to accompanying drawings. In the drawings, like numerals or symbols refer to like elements having substantially the same function, and the size of each element may be exaggerated for clarity and convenience of description. However, the configurations and functions illustrated in the following example embodiments are not to be construed as limiting the present disclosure and the configurations and functions. In the following descriptions, details about publicly known functions or features may be omitted if it is determined that they cloud the gist of the disclosure.

In the following example embodiments, terms 'first', 'second', etc. are simply used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be implemented as at least one integrated module. Further, in the following example embodiments, at least one among a plurality of elements refer to not only all of the plurality of elements but also each element among the plurality of elements excluding the other elements or a combination thereof.

FIG. 1 is a diagram illustrating an example electronic apparatus according to various embodiments.

FIG. 1 shows that a user holds an electronic apparatus 100. In this case, the electronic apparatus 100 refers to a movable electronic apparatus that may be implemented as a display apparatus capable of displaying an image. For example, the electronic apparatus 100 may include a TV, a computer, a smart phone, a tablet, a portable media player, a wearable device, a video wall, an electronic picture frame, etc. Because the electronic apparatus 100 is movable, the electronic apparatus 100 may provide content or the like relevant to a situation when a change occurs in a space where the electronic apparatus 100 is located, for example, when a user moves while holding the electronic apparatus 100. The above will be described in greater detail below.

Figure 2:
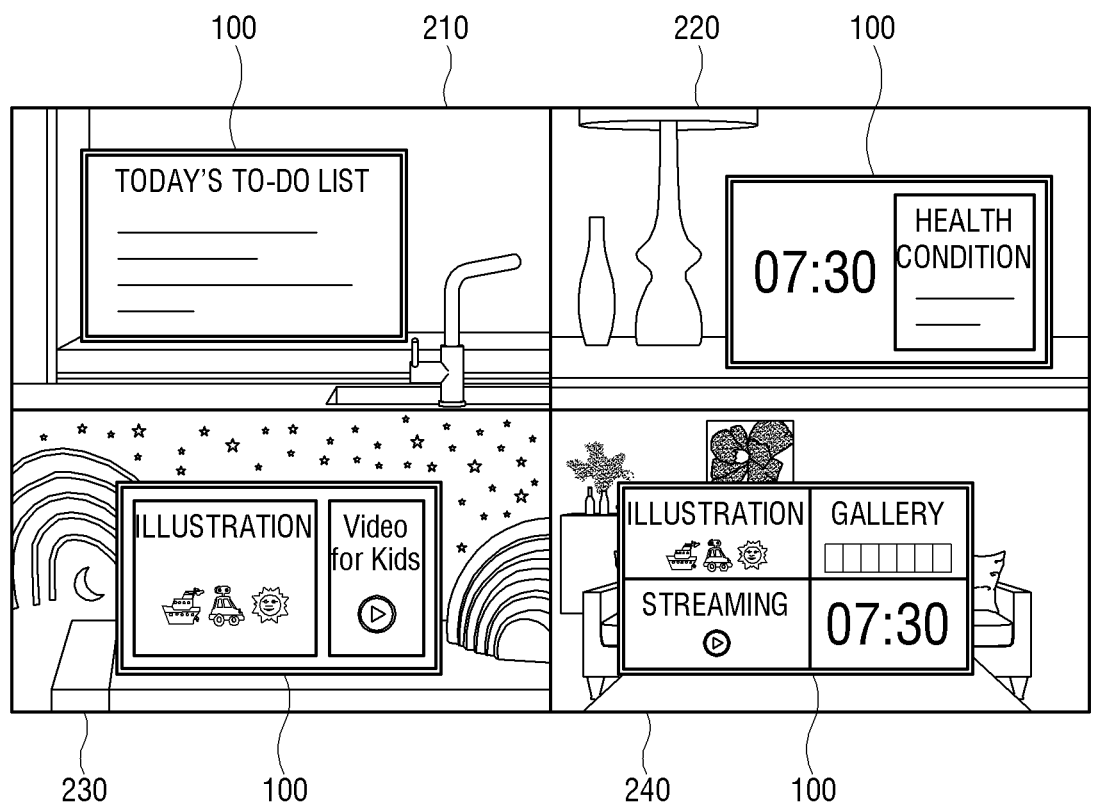
FIG. 2 is a diagram illustrating an example operation of an electronic apparatus according to various embodiments.

FIG. 2 is a diagram illustrating an example operation of an electronic apparatus according to various embodiments.

FIG. 2 shows content groups provided by the electronic apparatus 100 when the electronic apparatus 100 is located at four different spaces. The content group may include, but not limited to, not only content such as still images, and moving images, applications, but also icons for selecting them, widgets such as a widget for controlling Internet of things (IoT) or other external device, a widget showing a schedule or time, and a widget showing a health condition.

For example, it will be assumed that a first space 210 is a kitchen. When the electronic apparatus 100 is located in the kitchen, the electronic apparatus 100 may display a schedule table showing schedules such as a today's to-do list and the like to a user who prepares breakfast in the kitchen. In this case, the electronic apparatus 100 may identify a space, in which the electronic apparatus 100 is located, based on various methods such as image sensing, a global positioning system (GPS) signal, ultrasound, radio frequency (RF), infrared (IR) light, and a microphone 150. Each method will be described in greater detail below.

A second space 220 may be a primary bedroom. In the second space 220, the electronic apparatus 100 may display a widget showing time and date, and a widget showing a user's health condition such as sleep time.

A third space 230 may be a kids room. In the kids room, the electronic apparatus 100 may set a background image according to the interior color of the kids room. Further, the electronic apparatus 100 may display an image for children or an icon for viewing the image because a user is a child.

A fourth space 240 may be a living room. In the living room, the electronic apparatus 100 may set a background image according to the interior color of the living room. In the living room, the electronic apparatus 100 may display an album application for viewing pictures taken by a user, a TV application for viewing a broadcast in real time, and an application related to a streaming service.

Therefore, according to an embodiment of the disclosure, the electronic apparatus 100 can display an image and provide content according to the characteristics of the spaces, thereby improving user convenience.

Figure 3:
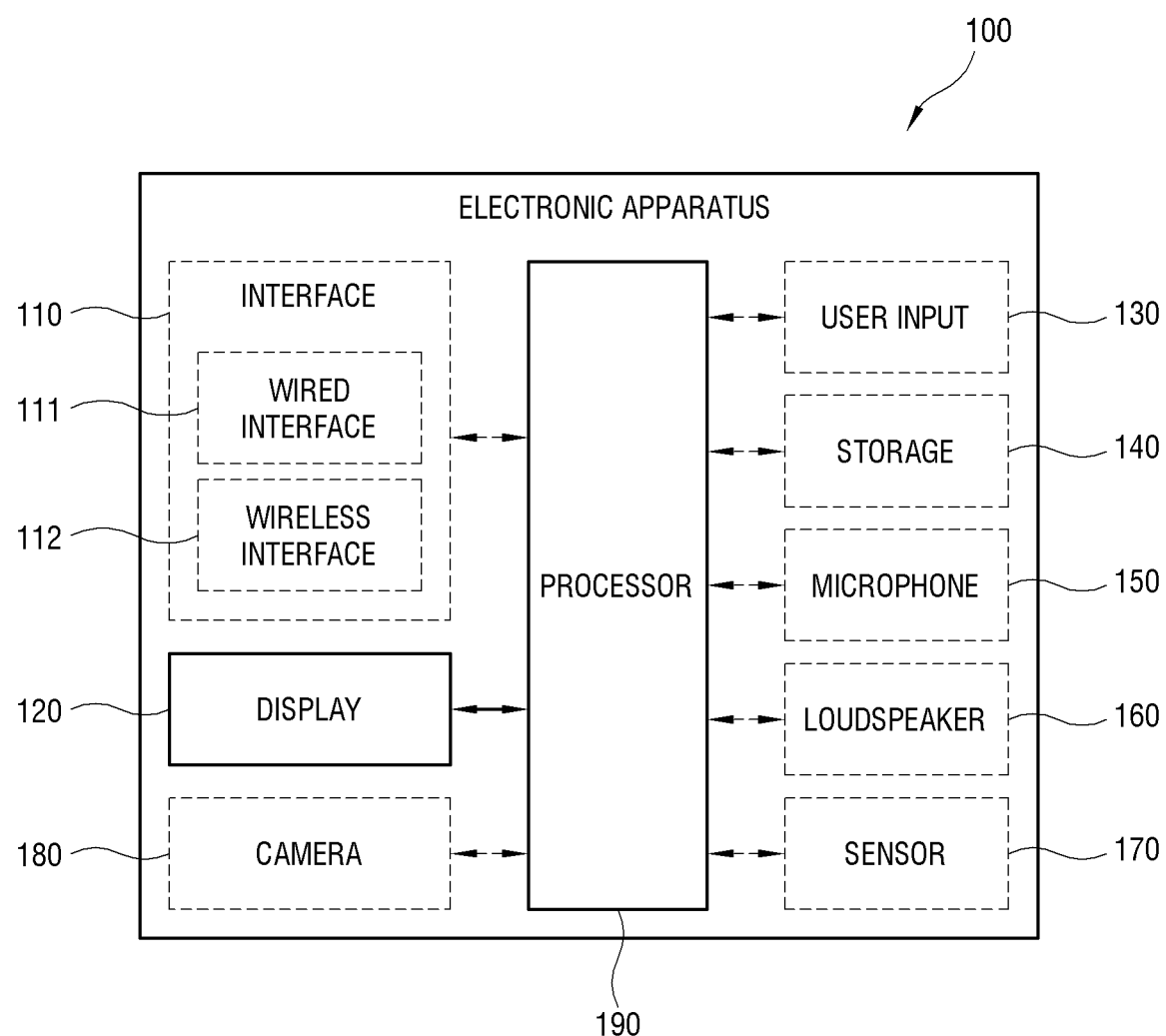
FIG. 3 is a block diagram illustrating an example configuration of an electronic apparatus according to various embodiments.

FIG. 3 is a block diagram illustrating an example configuration of an electronic apparatus according to various embodiments.

As shown in FIG. 3, the electronic apparatus 100 may include an interface (e.g., including various circuitry) 110. The interface 110 may include a wired interface 111. The wired interface 111 include a connector or port to which an antenna for receiving a broadcast signal based on broadcast standards such as terrestrial/satellite broadcasts, or a cable for receiving a broadcast signal based on a cable broadcast standards. Alternatively, the electronic apparatus 100 may include a built-in antenna for receiving a broadcast signal. The wired interface 111 may include a high definition multimedia interface (HDMI) port, a DisplayPort, a DVI port, and the like connector or port based on video and/or audio transmission standards such as Thunderbolt, composite video, component video, super video, and Syndicat des Constructeurs d'Appareils Radiorécepteurs et Téléviseurs (SCART). The wired interface 111 may include a connector or port based on universal data transmission standards, such as a universal serial bus (USB) port. The wired interface 111 may include a connector or port to which an optical cable based on optical transmission standards is connectable. The wired interface 111 may include a connector or port to which an external microphone or an external audio device with a microphone is connected for the reception or input of an audio signal from the audio device. The wired interface 111 may include a connector or port to which a headset, an earphone, an external loudspeaker and the like audio device is connected for the transmission or output of an audio signal to the audio device. The wired interface 111 may include a connector or port based on network transmission standards such as Ethernet. For example, the wired interface 111 may be implemented as a local area network (LAN) connected to a router or a gateway by a wire.

The wired interface 111 may be connected to a set-top box, an optical media reproducing device or the like external device, an external display apparatus, a loudspeaker, a server, etc. through the connector or port by 1:1 or 1:N (where, N is a natural number), thereby receiving a video/ audio signal from the external device or transmitting a video/audio signal to the external device. The wired interface 111 may include connectors or ports for individually transmitting video/audio signals.

In addition, according to an embodiment, the wired interface 111 may be built-in the electronic apparatus 100 or implemented as a dongle or a module and detachably connected to the connector of the electronic apparatus 100.

The interface 110 may include a wireless interface 112. The wireless interface 112 may be variously implemented corresponding to the implementation of the electronic apparatus 100. For example, the wireless interface 112 may employ wireless communication methods such as radio frequency, Zigbee, Bluetooth, Wi-Fi, ultrawideband (UWB), near field communication (NFC), etc. The wireless interface 112 may be implemented as a wireless communication module for performing wireless communication with an access point (AP) through Wi-Fi, or a wireless communication module for performing one-to-one direct wireless communication through Bluetooth or the like. The wireless interface 112 may transmit and receive a data packet to and from a server through the wireless communication with the server on a network. The wireless interface 112 may include an IR transmitter and/or an IR receiver to transmit and/or receive an IR signal based on IR communication standards. The wireless interface 112 may use the IR transmitter and/or IR receiver for the reception or input of a remote control signal from a remote controller or other external devices, or the transmission or output of a remote control signal to other external devices. The electronic apparatus 100 may transmit and receive a remote control signal to and from a remote controller or other devices through the wireless interface 112 based on other methods such as Wi-Fi and Bluetooth.

The electronic apparatus 100 may further include a tuner (not shown) to be tuned to channels for a received broadcast signal when the video/audio signal received through the interface 110 is a broadcast signal.

The electronic apparatus 100 may further include a display 120. The display 120 includes a display panel for displaying an image thereon. The display panel is provided as a light receiving structure such as, for example, and without limitation, a liquid crystal display (LCD), or a self-emissive structure such as an organic light emitting display (OLED). The display 120 may further include additional elements according to the structure of the display panel. For example, the display panel is provided as the LCD structure, the display 120 includes an LCD panel, a backlight unit for emitting light, and a panel driving substrate for driving the liquid crystal of the LCD panel.

The electronic apparatus 100 may include a user input (e.g., including input circuitry) 130. The user input 130 includes various types of input interface related circuits provided to receive a user's input. The user input 130 may be configured in various ways according to the types of the electronic apparatus 100. For example, the user input 130 may include mechanical or electronic buttons of the electronic apparatus 100, a remote controller separated from the electronic apparatus 100, an input unit of an external device connected to the electronic apparatus 100, a touch pad, a touch screen installed in the display 120, etc.

The electronic apparatus 100 may include a storage (e.g., a memory) 140. The storage 140 stores digitized data. The storage 140 may include a non-volatile storage in which data is retained regardless of whether power is supplied or not, and a volatile memory in which data to be processed by a processor 190 is loaded but not retained when power is not supplied. The non-volatile storage includes a flash-memory, a hard-disc drive (HDD), a solid-state drive (SSD), a read only memory (ROM), etc., and the volatile memory includes a buffer, a random access memory, etc.

The electronic apparatus 100 may include a microphone 150. The microphone 150 collects sounds of an external environment, such as a user's voice. The microphone 150 transmits a signal of a collected sound to the processor 190. The electronic apparatus 100 may include the microphone 150 for collecting a user's voice, or receive an audio signal from a remote controller, a smart phone and the like external device with a microphone through the interface 110. A remote control application may be installed in an external device to control the external device 100 or perform functions such as voice recognition. The external device installed with such an application may receive a user voice, and the external device may transmit and receive data to and from the electronic apparatus 100 and control the electronic apparatus 100 through Wi-Fi/Bluetooth, infrared, etc. To this end, a plurality of interfaces 110 for implementing the foregoing communication may be provided in the electronic apparatus 100.

The electronic apparatus 100 may include a loudspeaker 160. The loudspeaker 160 outputs a sound based on audio data processed by the processor 190. The loudspeaker 160 may include a unit loudspeaker provided corresponding to audio data of a certain audio channel, and may include a plurality of unit loudspeakers corresponding to audio data of a plurality of audio channels. The loudspeaker 160 may be provided separately from the electronic apparatus 100, and, in this case, the electronic apparatus 100 may transmit audio data to the loudspeaker 160 through the interface 110.

The electronic apparatus 100 may include a sensor 170. The sensor 170 may include various types of sensors including, for example and without limitation, an acceleration sensor, a gyro sensor, etc. The processor 190 may store sensing values, which is defined as user taps for the external device through the electronic apparatus 100, in the storage 140. When a user event is detected later, the processor 190 may identify whether the user event occurs or not based on the detected sensing value matches the stored sensing value.

The electronic apparatus 100 may include a camera 180. The processor 190 may capture images of an environment around the electronic apparatus 100 through the camera 180 positioned in the front or back of the electronic apparatus 100.

The electronic apparatus 100 may include a processor (e.g., including processing circuitry) 190. The processor 190 may include, for example, and without limitation, one or more hardware processors implemented as a central processing unit (CPU), a chipset, a buffer, a circuit, etc. mounted to a printed circuit board, and may be designed as a system on chip (SOC). The processor 190 includes modules corresponding to various processes, such as a demultiplexer, a decoder, a scaler, an audio digital signal processor (DSP) and an amplifier when the electronic apparatus 100 is implemented as the display apparatus. Some or all of such modules may be implemented as the SOC. For example, the demultiplexer, the decoder, the scaler, and the like module related to image processing may be implemented as an image processing SOC, and the audio DSP may be implemented as a chipset separately from the SOC.

The processor 190 may include various processing circuitry and obtain a voice signal of a user's voice through the microphone 150 and convert the voice signal into voice data. In this case, the voice data may be text data obtained by a speech-to-text processing process that converts the voice signal into text data. The processor 190 identifies a command based on the voice data, and performs an operation based on the identified command. Both the process of processing the voice data and the process of identifying the command may be performed in the electronic apparatus 100. However, in this case, the system load and storage capacity required for the electronic apparatus 100 are relatively large, and therefore at least a part of the process may be performed by at least one server connected for communication to the electronic apparatus 100 through the network.

The processor 190 according to the disclosure may call at least one command among commands of software stored in a storage medium readable by a machine such as the electronic apparatus 100, and execute the called command. This enables the electronic apparatus 100 and the like device to operate and perform at least one function based on at least one called command. One or more commands may include a code created by a compiler or a code executable by an interpreter. The machine-readable storage medium may be provided in the form of a non-transitory storage medium. Here, the 'non-transitory' storage medium is a tangible device and may not include a signal (e.g., an electromagnetic wave), and this term does not distinguish between a case where data is semi-permanently stored in the storage medium and a case where data is temporarily stored.

Meanwhile, the processor 190 may use at least one of machine learning, a neural network, and deep learning algorithm as rule-based or artificial intelligence (AI) algorithms to perform at least a part of data analysis, processing, and result information generation for: identifying that the electronic apparatus 100 is located in the first space among the plurality of spaces; displaying an image of a first content group, which includes at least one piece of first content corresponding to the first space among the plurality of piece of contents, on the display 120; identifying that the electronic apparatus 100 moves from the first space to the second space; and displaying an image of a second content group, which includes at least one piece of second content corresponding to the identified second space, on the display 120.

For example, the processor 190 may perform both functions of a learner and a recognizer (e.g., including various processing circuitry and/or executable program instructions). The learner may function to generate a trained neural network, and the recognizer may function to recognize (or infer, predict, estimate, and determine) data through the trained neural network. The learner may generate or update the neural network. The learner may acquire learning data to generate the neural network. For example, the learner may acquire the learning data from the storage 140 or the outside. The learning data may refer to data used for learning of the neural network, and the data obtained by performing the foregoing operations may be used as the learning data to train the neural network.

Before training the neural network with the learning data, the learner may perform preprocessing to the acquired learning data, or may select data to be used in training among a plurality of pieces of learning data. For example, the learner may process the learning data into a preset format, or may process the learning data into a form suitable for the learning by filtering or noise addition/removal. The learner may generate the neural network set to perform the foregoing operations through the preprocessed learning data.

The trained neural network may include a plurality of neural networks (or layers). Nodes in the plurality of neural network may have weighted values, and the plurality of neural networks may be connected to each other so that an output value of one neural network can be used as an input value of another neural network. The neural network may include, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, and the like models.

Meanwhile, the recognizer may acquire target data to perform the foregoing operations. The target data may be acquired from the storage 140 or the outside. The target data may be data targeted for being recognized by the neural network. Before applying the target data to the trained neural network, the recognizer may preprocess the acquired target data, or select data to be used in recognition among a plurality of pieces of target data. For example, the recognizer may process the target data into a preset format, filter the target data, or add/remove noise to/from the target data, thereby processing the target data into a form of data suitable for the recognition. The recognizer applies the preprocessed target data to the neural network, and thus acquires the output value output from the neural network. The recognizer may obtain a probability value or a reliability value together with the output value.

For example, a method of controlling the electronic apparatus 100 according to various embodiments may be provided as included in a computer program product. The computer program product may include the commands of the software executed by the processor 190 as described above. The computer program product may be traded between a seller and a buyer as a product. The computer program product may be distributed in the form of a machine-readable storage medium (e.g., a CD-ROM), or may be distributed directly between two user apparatuses (e.g., smart phones) or distributed online (e.g., downloaded or uploaded) or through an application store (e.g., Play Store™). In the case of the online distribution, at least a part of the computer program product may be temporarily stored or transitorily generated in the machine-readable storage medium such as the memory of a manufacturer server, an application store server or a relay server.

Figure 4:
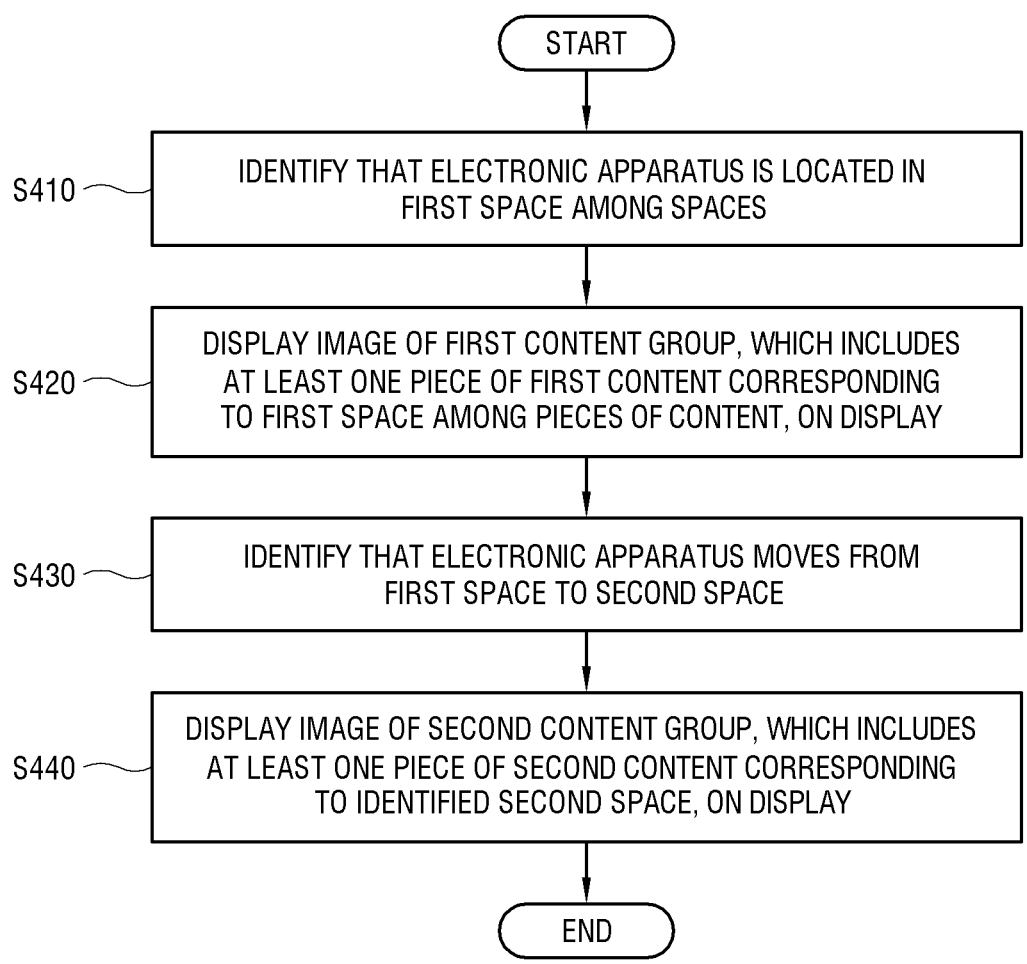
FIG. 4 is a flowchart illustrating an example operation of an electronic apparatus according to various embodiments.

FIG. 4 is a flowchart illustrating an example operation of an electronic apparatus according to various embodiments.

According to an embodiment of the disclosure, the processor 190 may identify that the electronic apparatus 100 is located in the first space among the plurality of spaces (S410). In this case, the first space, the second space and the like term including the ordinal number are used only for distinguishing one element from another element, and do not necessarily correspond the first space 210 and the second space 220 described above with reference to FIG. 2.

In this case, the processor 190 may obtain information about the space where the electronic apparatus 100 is located, and identify the space where the electronic apparatus 100 is located based on the obtained information and reference information set corresponding to the plurality of spaces. The processor 190 may obtain information about the space where the electronic apparatus 100 is located, by various methods of receiving a user's input for the information about the space where the electronic apparatus 100 is located through the display 120, the user input 130, etc. or using the image sensing, the GPS, the signal strength, the RF, the IR, the microphone 150, etc. as mentioned above. In this case, the processor 190 may identify the space where the electronic apparatus 100 is located based on the reference information set corresponding to the plurality of spaces, and the reference information may refer to information previously prepared for the spaces through the foregoing techniques. Therefore, the processor 190 may obtain information about the space where the electronic apparatus 100 is located, and compare the obtained information with the previously prepared reference information to identify the space where the electronic apparatus 100 is being currently located.

For example, in the case of the image sensing, the electronic apparatus 100 may use the built-in camera 180 embedded in a certain part of the electronic apparatus 100, or an external camera connected to the electronic apparatus 100. The processor 190 controls the camera to capture images of surrounding environments around the electronic apparatus 100, and analyzes the captured image, thereby identifying the space where the electronic apparatus 100 is located among the plurality of spaces. In more detail, furniture, external device, etc. located in the spaces are set as the reference information in advance, and the furniture, the external device, etc. in the captured image are compared with those of the reference image, thereby identifying the space where the electronic apparatus 100 is located. A furniture layout, a wallpaper color, etc. in each space is highly likely to be fixed, and therefore an image for each space may be captured in advance so that a user can make an input for designating where each space is. Therefore, the processor 190 may use the camera 180 to capture an image, and compare the captured image with a previously captured and stored image, thereby identifying which space the electronic apparatus 100 is currently located in. The processor 190 may identify the space where the electronic apparatus 100 is located, based on the kinds of furniture or external device shown in the captured image. For example, the processor 190 may determine the space as a kitchen when a refrigerator, a sink, etc. are identified in the captured image, or may determine the space as a living room when a TV, a sofa, etc. are identified in the captured image.

To identify the location of the electronic apparatus 100, the processor 190 may for example use a global positioning system (GPS). In this case, the GPS coordinates of each space is registered as the reference information, and GPS information is detected to identify the space where the electronic apparatus 100 is being currently located.

The processor 190 may use an AP such as a Wi-Fi router. For example, the processor 190 registers information about the strength of a Wi-Fi signal received in the AP as the reference information for each space, and identify the location of the electronic apparatus 100 based on the strength of the received signal.

The processor 190 may control the display 120 to display a graphic user interface (GUI) for setting the reference information, receive a user's input for setting the reference information through the displayed GUI, and set the reference information based on the received input of the user.

As another example of identifying the space where the electronic apparatus 100 is located, the processor 190 may identify the location of the electronic apparatus 100 based on the location of an external device when the external device present around the electronic apparatus 100. To this end, various techniques may be used as follows.

In the case of the RF, the processor 190 may detect a signal generated from the external device through the sensor 170, and estimate the distance and direction between the external device and the electronic apparatus 100 based on the strength of the detected signal. The processor 190 may identify the space where an external device having a corresponding locational relationship with the external device identified based on the reference information is located, thereby identifying the space where the electronic apparatus 100 is located. Even in other techniques to be described below, the identification of the location of the external device is equally applied to the identification of the space where the electronic apparatus 100.

In the case of the IR, the processor 190 may identify the location of the external device based on the distance and direction between the external device and the electronic apparatus 100 by detecting the amount of IR emitted from the sensor 170 and reflected from the external device located around the electronic apparatus 100.

In the case of using the sound collected in the microphone 150, the location of a sound source may be identified based on a difference in time taken for the sound to reach a specific area, as one of methods of estimating a direction where a sound is generated. When a sound is generated from the external device, there is a difference in time for the generated sound to reach two certain points of the electronic apparatus 100, and the processor 190 may estimate a distance from the external device to the electronic apparatus 100 based on the speed of the sound and the time taken in reaching each point, thereby identifying the location of the external device.

Further, in the case of using a BLE signal of a Bluetooth module, for example, when an undirected advertising packet is received from an external device around the electronic apparatus 100, the processor 190 may identify a distance between the electronic apparatus 100 and that external device based on a received signal strength indicator (RSSI) value of the packet, thereby identifying the location of the external device.

The processor 190 may display an image of a first content group, which includes at least one piece of first content corresponding to the first space among the plurality of pieces of content, on the display (S420).

The processor 190 may identify that the electronic apparatus moves from the first space to the second space (S430). As described above, the electronic apparatus 100 may be manufactured small enough to be easily carried by a user, or may be mounted with a device, e.g., a stand with wheels by which the electronic apparatus 100 can move.

The processor 190 may identify the moving distance of the electronic apparatus 100 based on the reference information or technique used in identifying the space where the electronic apparatus 100 is located. For example, the processor 190 may identify whether the electronic apparatus 100 moves or not by newly performing the image sensing or detecting the GPS information based on a predefined (e.g., specified) criterion such as a certain period. The processor 190 may detect the movement of the electronic apparatus 100 based on change in the strength of a signal received from the Wi-Fi router, and identify the location of the electronic apparatus 100 after the movement.

The processor 190 may identify the moving distance of the electronic apparatus 100, and identify the space where the electronic apparatus 100 is located is moved based on the identified moving distance.

The processor 190 may display an image of a second content group, which includes at least one piece of second content corresponding to the identified second space, on the display (S440).

According to an embodiment of the disclosure, a content group that a user frequently uses or is highly likely to use is displayed based on the space where the electronic apparatus 100 is located, thereby improving user convenience in using the electronic apparatus, and further flexibly providing the content group by detecting the change in the space where the electronic apparatus 100 is located.

Figure 5:
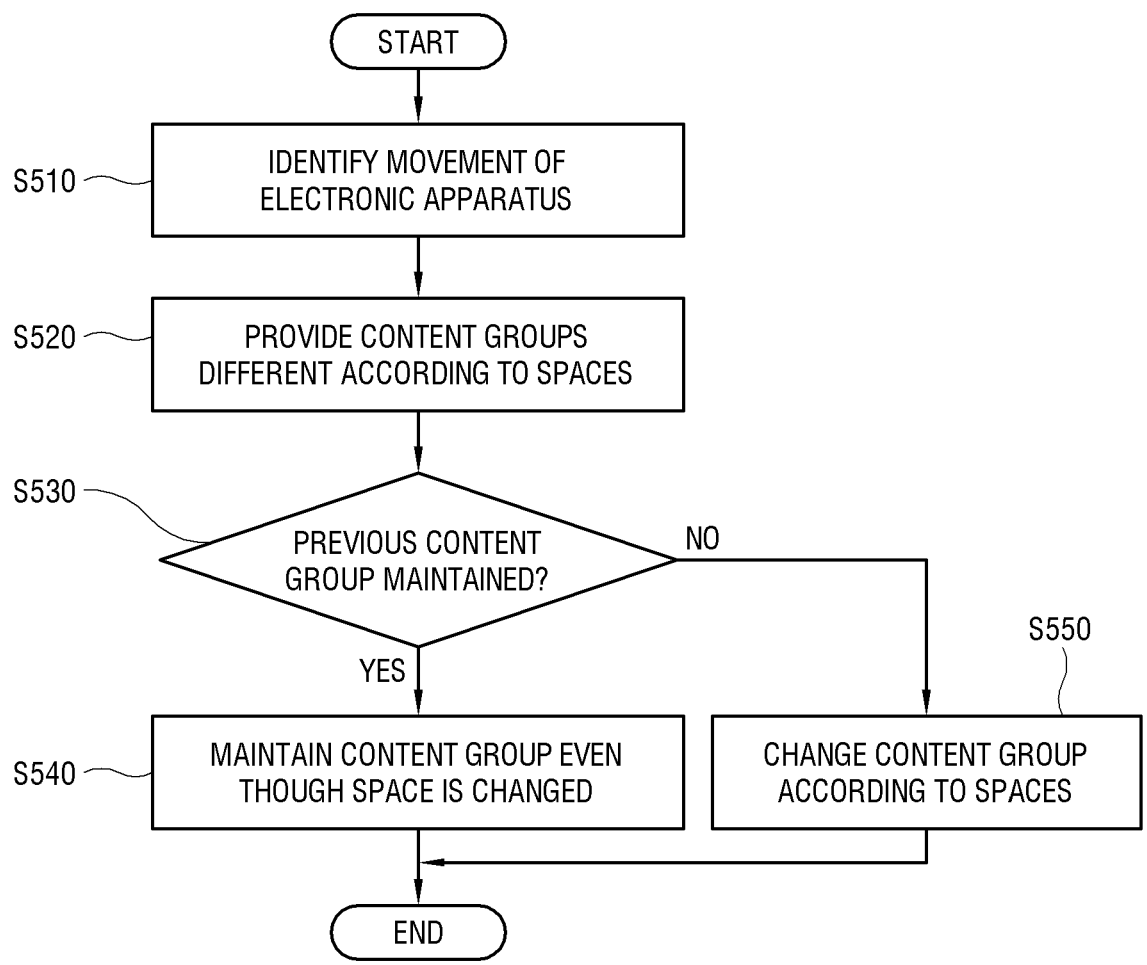
FIG. 5 is a flowchart illustrating an example operation of an electronic apparatus according to various embodiments.

FIG. 5 is a flowchart illustrating an example operation of an electronic apparatus according to various embodiments.

The processor 190 may identify that the electronic apparatus 100 moves (S510). When the space where the electronic apparatus 100 is located is changed as the electronic apparatus 100 moves, as described above with reference to FIG. 4, the processor 190 may provide content groups that differ based on the spaces (or display images of content groups different according to the spaces on the display) (S520). The processor 190 may identify whether to maintain the content group provided in the space before the electronic apparatus 100 moves (S530). For example, the processor 190 may, but is not limited to, receive a user's input about whether to maintain the content group through the GUI or the like, or identify whether to maintain the content group based on a use history or the like. When it is identified that the content group is maintained (YES in S530), the processor 190 may maintain the content group even though the space is changed (S540). On the other hand, when it is identified that the content group is not maintained (NO in S530), the processor 190 may change the content group to provide another content group corresponding to the space (S550). However, in the various example embodiments, descriptions are made on the assumption that the content group is differently provided according to the spaces.

According to the disclosure, the surrounding situations of the electronic apparatus 100 may be changed by a user together with or separately from the change in the location of the electronic apparatus 100. For example, there are various cases, such as a case where a user of the electronic apparatus 100 may be changed when the electronic apparatus 100 is located in a certain space, or a case where a user may move between the spaces when the electronic apparatuses 100 are respectively located in the plurality of spaces. According to an embodiment of the disclosure, the processor 190 may, but not limited to, take both or at least one of the space and the user into account, thereby providing the corresponding content group. The change of the user will be described in greater detail below with reference to FIGS. 7, 8 and 9.

Figure 6:
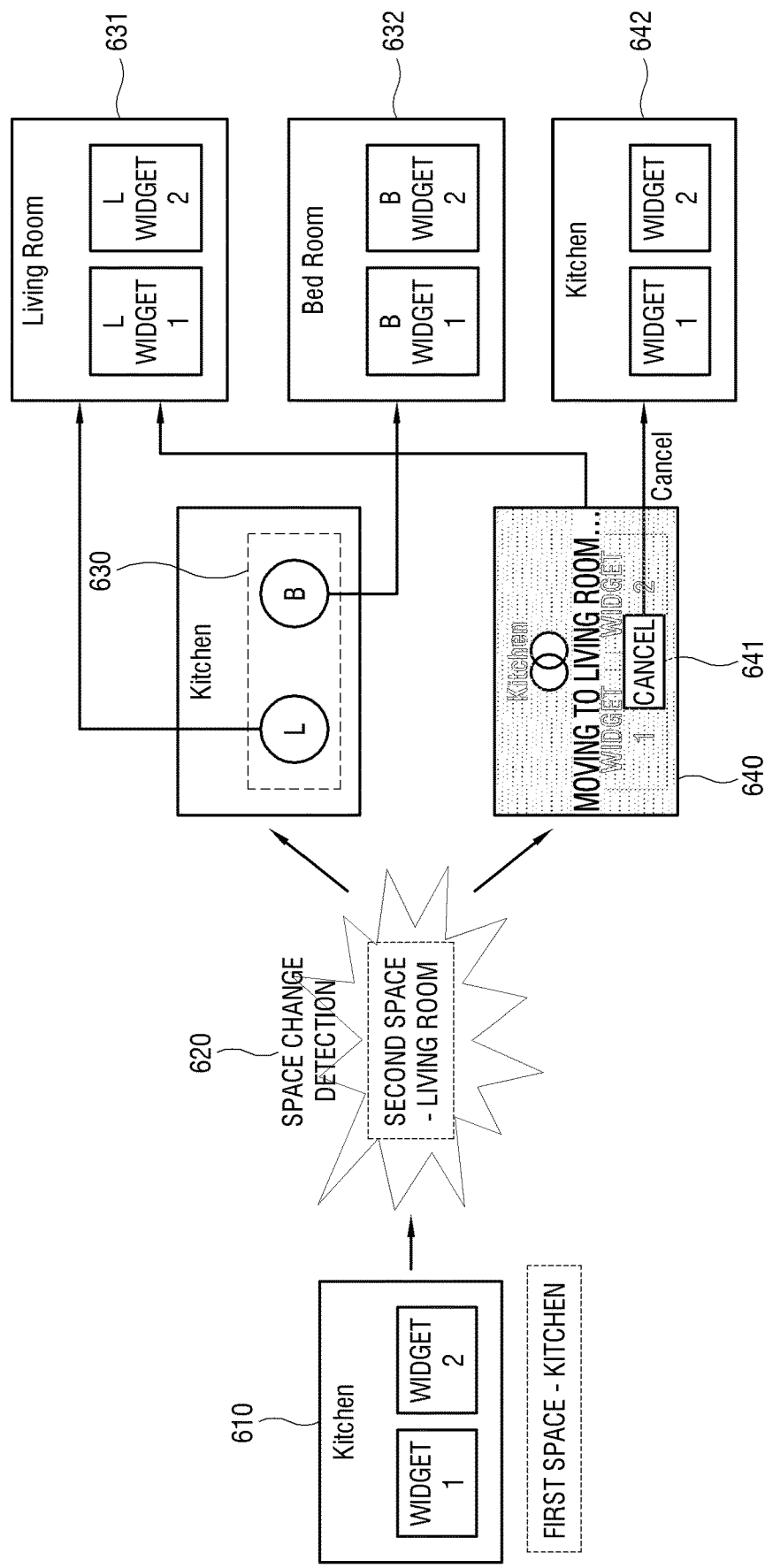
FIG. 6 is a diagram illustrating an example operation of an electronic apparatus according to various embodiments.

FIG. 6 is a diagram illustrating an example operation of an electronic apparatus according to various embodiments. FIG. 6 shows that, when the space where the electronic apparatus 100 is located is changed, the processor 190 detects the change or receives a user's input about the change in the space to provide the content group corresponding to the changed space.

As shown in FIG. 6, the electronic apparatus 100 is located in a first space, e.g., a kitchen, and displays an image 610 of a first content group including at least one piece of content corresponding to the kitchen. The processor 190 may detect that the electronic apparatus 100 moves from the first space to a second space, e.g., a living room, (620). In this case, the processor 190 may identify the change in the space based on the techniques described above with reference to FIG. 4.

The processor 190 may control the display to display a GUI 630 for selecting one among the plurality of spaces as a space where the electronic apparatus 100 is being currently located, and receives a user's input of selecting the space where the electronic apparatus 100 is located through the displayed GUI 630. The processor 190 may identify the space where the electronic apparatus 100 is located based on the received input of the user. Therefore, when receiving a user's input that the space to which the electronic apparatus 100 moves is the living room, the processor 190 may provide an image 631 of a second content group including at least one piece of content corresponding to the living room. Alternatively, when receiving a user's input that the space to which the electronic apparatus 100 moves is a bedroom, the processor 190 may provide an image 632 of a second content group including at least one piece of content corresponding to the bedroom.

According to an embodiment of the disclosure, when it is difficult to recognize which space the electronic apparatus 100 moves to or even when the corresponding space is recognized, the space is clearly confirmed by a user's input so that the processor 190 can provide an appropriate service.

Further, the processor 190 may detect that the electronic apparatus 100 moves from the first space to the second space, e.g., the living room (620), and display an image 640 showing that the space is moving or changing on the display. The processor 190 may provide the image 631 of the second content group including at least one piece of content corresponding to the living room based on the identification that the space is changed to the living room.

In this case, the processor 190 may display a cancel icon 641 for canceling the change in the space together with an image that the space is changing. When receiving a user's input for canceling the change in the space, the processor 190 may identify that the detected movement of the electronic apparatus 100 to the space is erroneously recognized or that the electronic apparatus 100 moves to a space other than the living room, and provide an image 642 of the existing first content group including at least one piece of content corresponding to the kitchen.

In addition, according to an embodiment of the disclosure, when receiving a user's input for canceling the change in the space even though it is detected that the electronic apparatus 100 has moved, the processor 190 may identify that the space to which the electronic apparatus 100 moves is erroneously detected, thereby providing the GUI again to select which space the electronic apparatus 100 has moved to.

Figure 7:
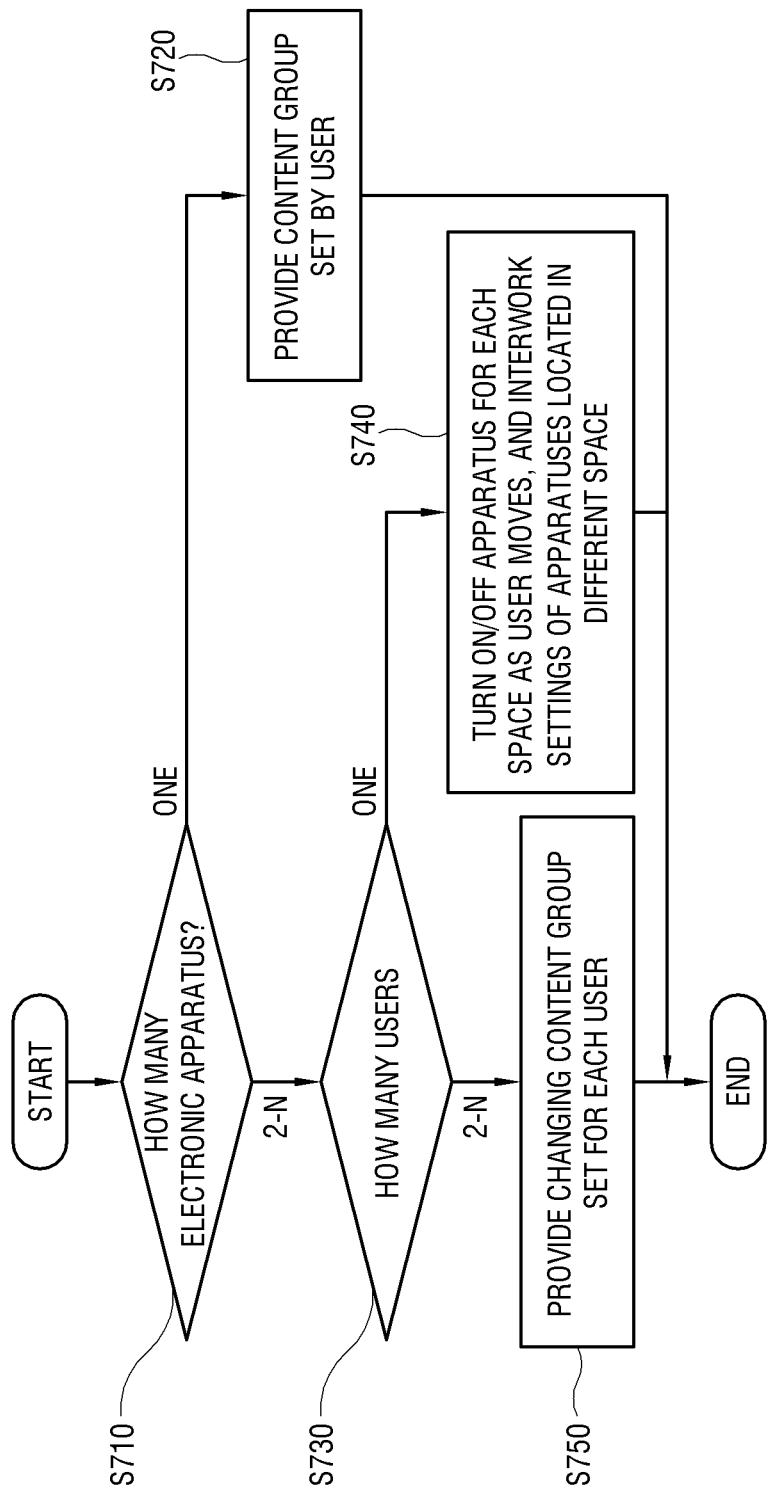
FIG. 7 is a flowchart illustrating an example operation of an electronic apparatus according to various embodiments.
Figure 8:
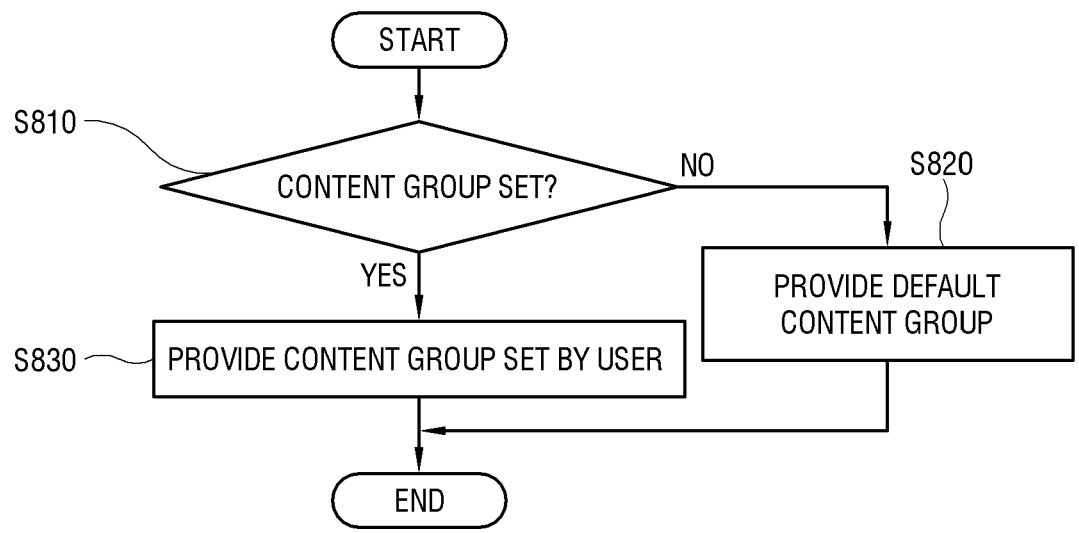
FIG. 8 is a flowchart illustrating an example operation of an electronic apparatus according to various embodiments.
Figure 9:
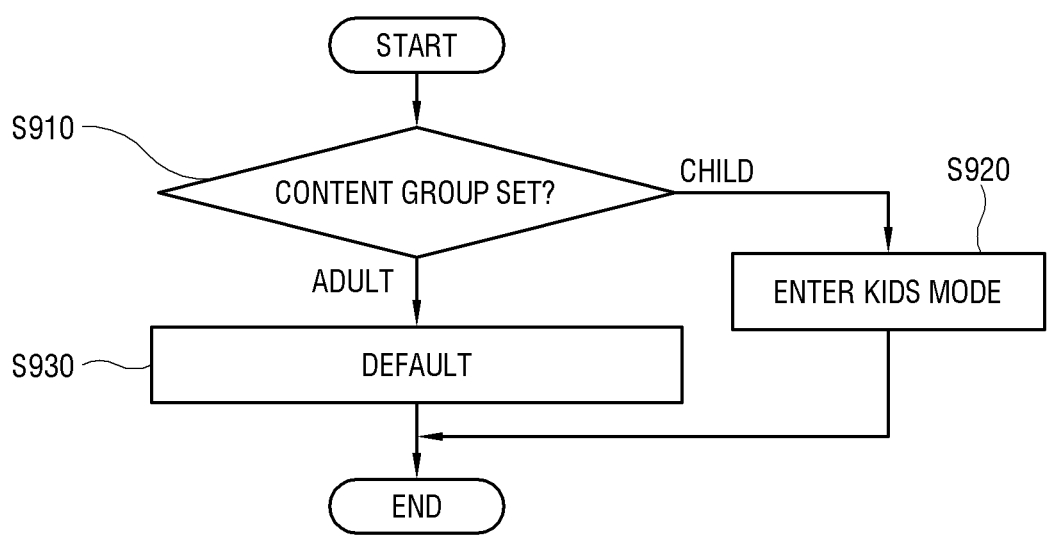
FIG. 9 is a flowchart illustrating an example operation of an electronic apparatus according to various embodiments.

FIGS. 7, 8 and 9 are flowcharts illustrating example operations of an electronic apparatus that provides a content group for each user according to various embodiments.

FIG. 7 shows that the content groups are provided based on the number of electronic apparatuses 100 and the number of users. When one electronic apparatus 100 is provided (one in S710), the processor 190 identifies a user who is using the electronic apparatus 100 among the plurality of users, and identify a content group corresponding to the identified user (S720). In other words, the electronic apparatus 100 may provide the content group for each user.

When two or more electronic apparatuses 100 are provided (2–N in S710), the content group may be differently provided according to the number of users. When there is one user (one in S730), the processor 190 may turn on/off the electronic apparatus 100 for each space as the user moves, and interworks settings with the electronic apparatuses 100 located in other spaces (S740). For example, when the electronic apparatuses 100 are respectively installed in the kitchen and the living room, and a user who is using the electronic apparatus 100 in the kitchen moves to the living room, the processor 190 may control the electronic apparatus 100 located in the living room to interwork and display the content group provided by the electronic apparatus 100 located in the kitchen.

When there are two or more users (2–N in S730), the plurality of electronic apparatuses 100 may change and provide the content group set for each user (S750). In other words, the processor 190 may identify a user who is using the electronic apparatus among the plurality of users, and identify the content group corresponding to the identified user.

Referring to FIG. 8, the processor 190 may identify whether a user has previously set the content group to be used for each space (S810). When a user's input or information for setting the content group for each space is not received (NO in S810), the processor 190 may identify the space where the electronic apparatus 100 is located and provide a default content group (S820). When the user's input or information is received (YES in S810), the processor 190 may provide the content group that has been set by the user (S830).

Referring to FIG. 9, the processor 190 may identify an age group of a user who is using the electronic apparatus 100 (S910), and enter a kids mode for limiting the age group of the provided content when the user is a child (CHILD in S910) (S920) or provide a default content group when the user is an adult (ADULT in S910) (S930). To identify the age group of a user, the processor 190 may use various methods of collecting user information through login or estimating the age of the user by comparing an image captured by the image sensing with established data.

In the cases of FIGS. 7, 8 and 9, various factors such as the change of a user, the movement of a user, the age group of a user, etc. may be additionally taken into account besides space-based situations, so that the electronic apparatus can provide a content group more relevant to the situations.

Figure 10:
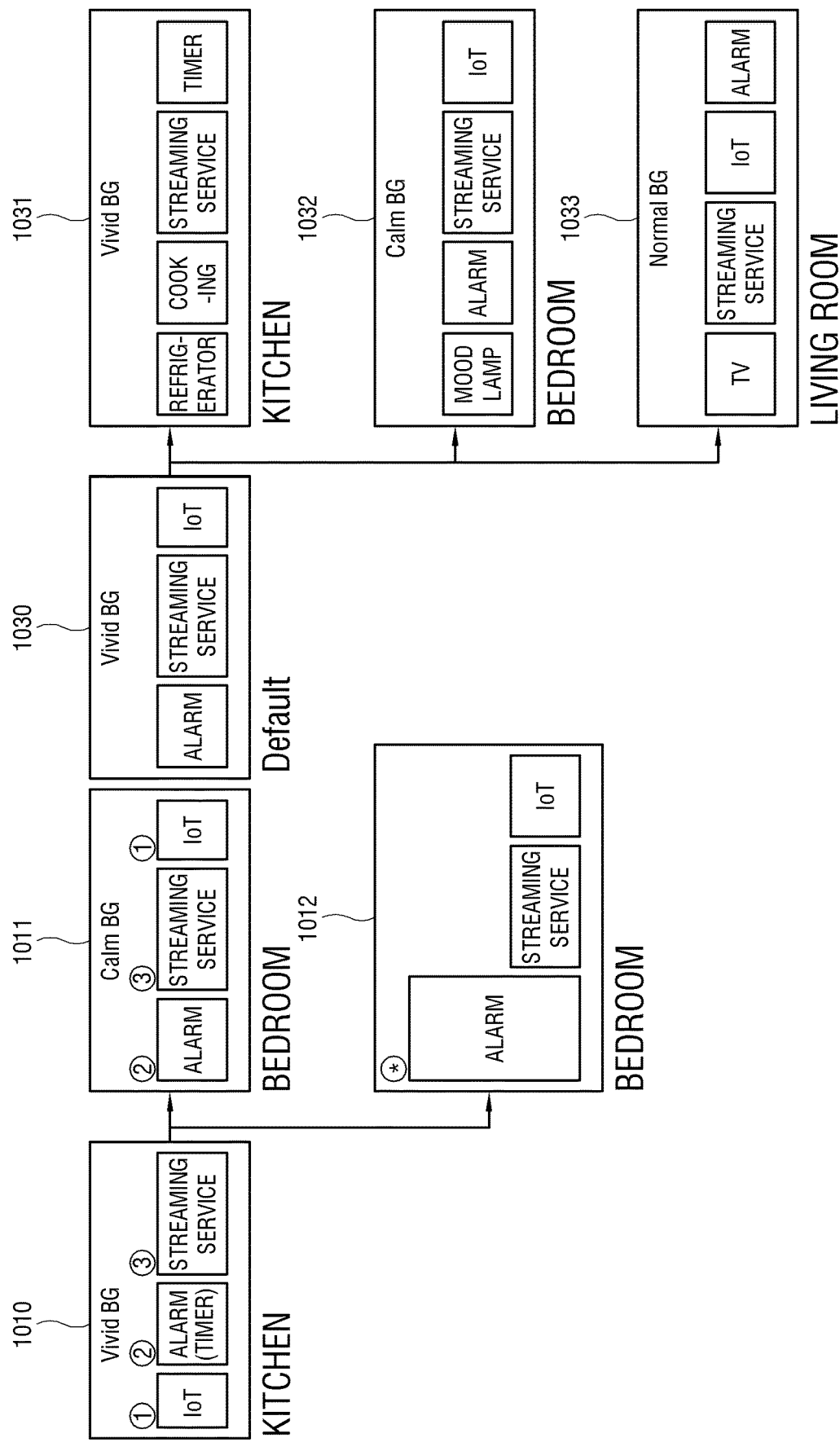
FIG. 10 is a diagram illustrating an example operation of an electronic apparatus according to various embodiments.

FIG. 10 is a diagram illustrating an example operation of an electronic apparatus according to various embodiments. The processor 190 may identify a content group corresponding to a space identified based on the priority of the content group previously defined according to the plurality of spaces. The priority may be, but not limited to, defined by receiving a user's input of designating content or widget the user prefers in the corresponding space, or defined by a use history such as a history of using an application multiple times or a recently used application.

For example, in the case of the kitchen, the processor 190 may provide an image 1010 of the content group including an IoT application for controlling the external devices wirelessly, an alarm (timer) frequently used when cooking based on a user history, and an application providing a streaming service for viewing an image during cooking or eating in order. In addition, when it is identified that the electronic apparatus 100 moves to the bedroom, the processor 190 may rearrange the content group in order of the alarm, the streaming service and the IoT as shown in an image 1011, based on the defined priority of the content group. In this case, the processor 190 may increase the size of the alarm widget, which is the most important widget among three widgets, as shown in an image 1012, thereby improving user convenience. Besides, the application, the widget, etc. may be used in various ways through addition, deletion, etc.

The processor 190 may identify the surrounding environment of the identified space, and control the display to display an image of identified content based on the identified surrounding environment. For example, the processor 190 may display the image 1010 of the electronic apparatus 100 in a vivid tone in the kitchen, and change the image 1011 into a calm tone when moved to the bedroom. In this regard, details will be described with reference to FIG. 11.

The processor 190 may control the display to provide a GUI for changing the settings of the external device located in the space, based on the identified surrounding environments. For example, when a default image 1030 is displayed, the processor 190 may control the display to display the IoT applications for controlling a refrigerator in the kitchen where the electronic apparatus 100 is located, a mood lamp in the bedroom, and a TV in the living room like images 1031, 1032, and 1033. Besides, the content group may be reconfigured corresponding to the identified space based on the priority of the content group previously defined for each space.

According to an embodiment of the disclosure, situations related to both the space and the user are taken into account together, and the content group is variously reconfigured reflecting the situations, thereby providing a more useful service.

Figure 11:
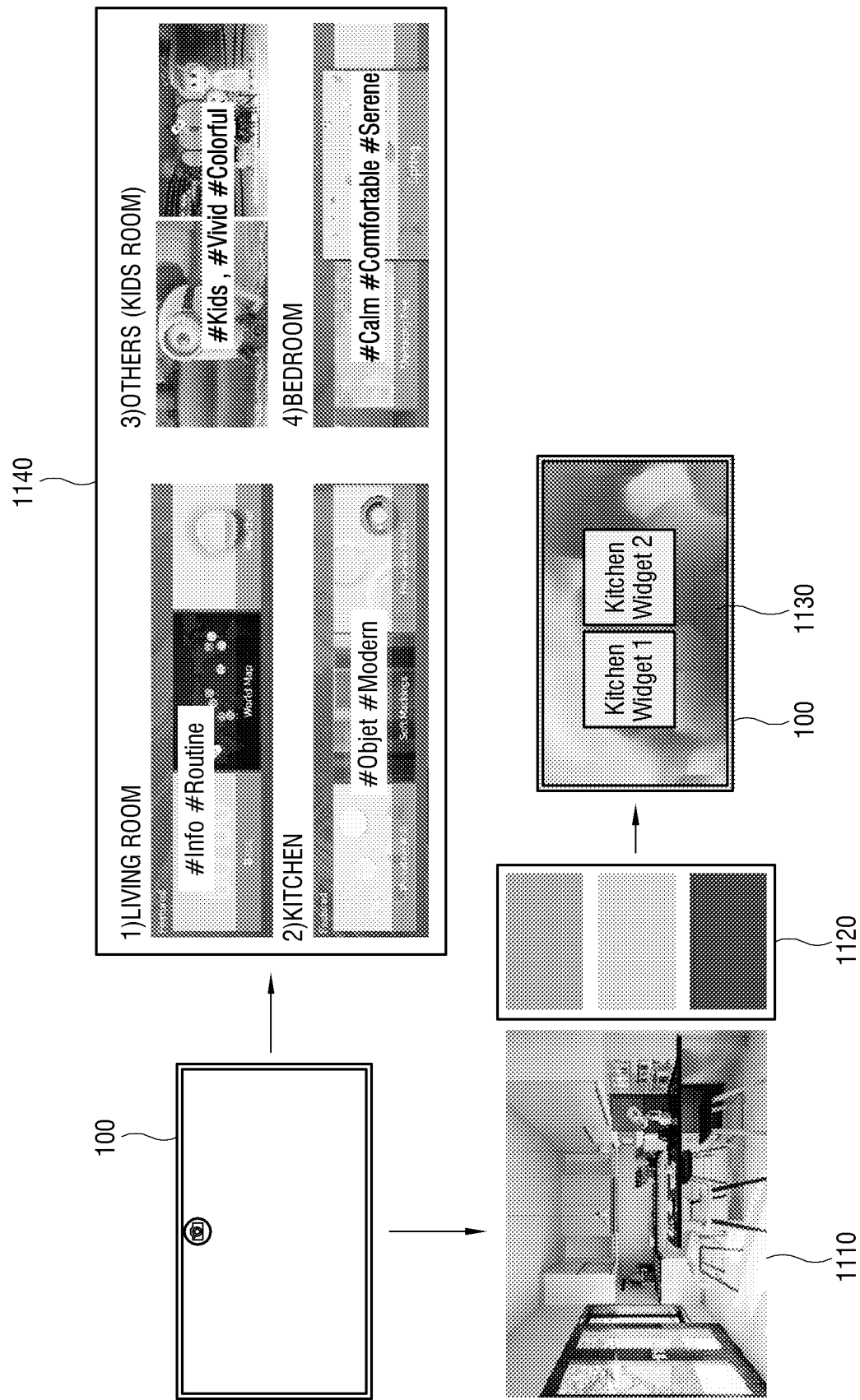
FIG. 11 is a diagram illustrating an example operation of an electronic apparatus according to various embodiments.

FIG. 11 is a diagram illustrating an example operation of an electronic apparatus according to various embodiments. The processor 190 identifies the surrounding environments of the identified space, and controls the display 120 to display a background image based on the identified surrounding environments. For example, the processor 190 may extract a representative color of an image 1110 from the image 1110 obtained by capturing the surrounding environments through the camera 180 or a connected external camera. The processor 190 may use the extracted color 1120 to set the background image like an image 1130.

The processor 190 may identify the characteristics for each space, classify the characteristics by tags, and change the background image with the color, pattern, image, etc. corresponding to the tags 1140. For example, in the case of the bedroom, the characteristics may be classified by #Calm, #Comfortable, #Serene and the like tags, and thus the background image may be set with a tone, a pattern, etc. suitable for the tags. Therefore, when the space is changed like the images 1010 and 1011 of FIG. 10, the vivid tone may be changed into the calm tone.

According to an embodiment of the disclosure, not only the content or the widget but also the background image is displayed harmoniously with the surrounding situations of the electronic apparatus, thereby improving aesthetic sensibility.

Figure 12:
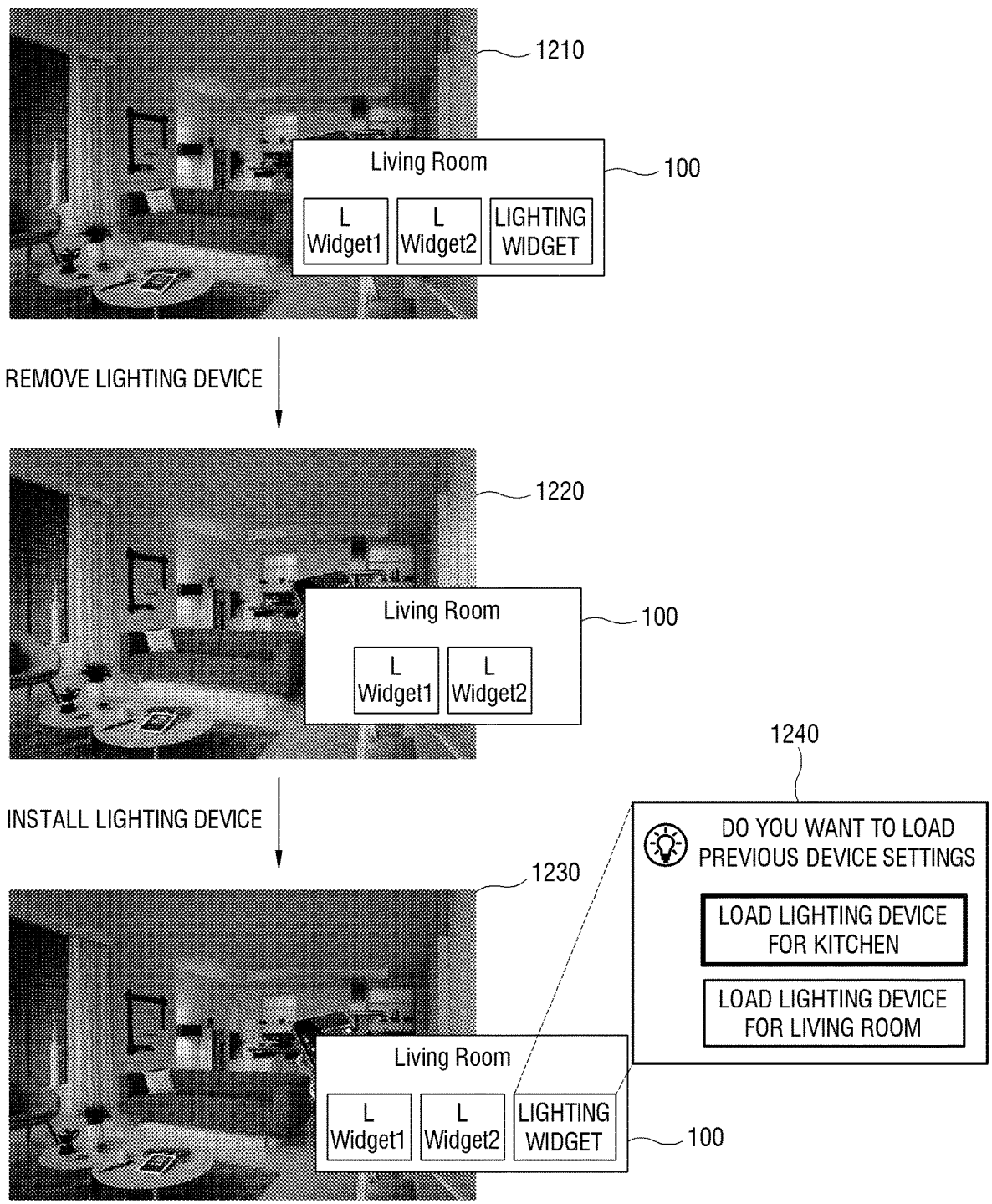
FIG. 12 is a diagram illustrating an example operation of an electronic apparatus according to various embodiments.

FIG. 12 is a diagram illustrating an example operation of an electronic apparatus according to various embodiments. The processor 190 may identify the use history of the electronic apparatus 100, and identify the content corresponding to the identified space based on the identified use history of the electronic apparatus 100. FIG. 12 shows the spaces 1210, 1220 and 1230 where the electronic apparatus 100 is located and their corresponding images of the electronic apparatus 100. In the space 1210, a lighting device is connected, and the processor 190 may display a widget for controlling the lighting device on the image. In this case, when the lighting device is turned off or released from the connection like the space 1220, the processor 190 may reconfigure the image by removing or reducing the widget for the lighting device. When the lighting device is turned on or connected again like the space 1230, the processor 190 may display the widget for controlling the lighting device. When the connected lighting device has a previously connected history, it is possible to call the previous settings for the lighting device by clicking the widget 1240.

According to an embodiment of the disclosure, it is possible to control the external device connected to the electronic apparatus 100, and refer to even the history of the previous settings, thereby improving user convenience.

Figure 13:
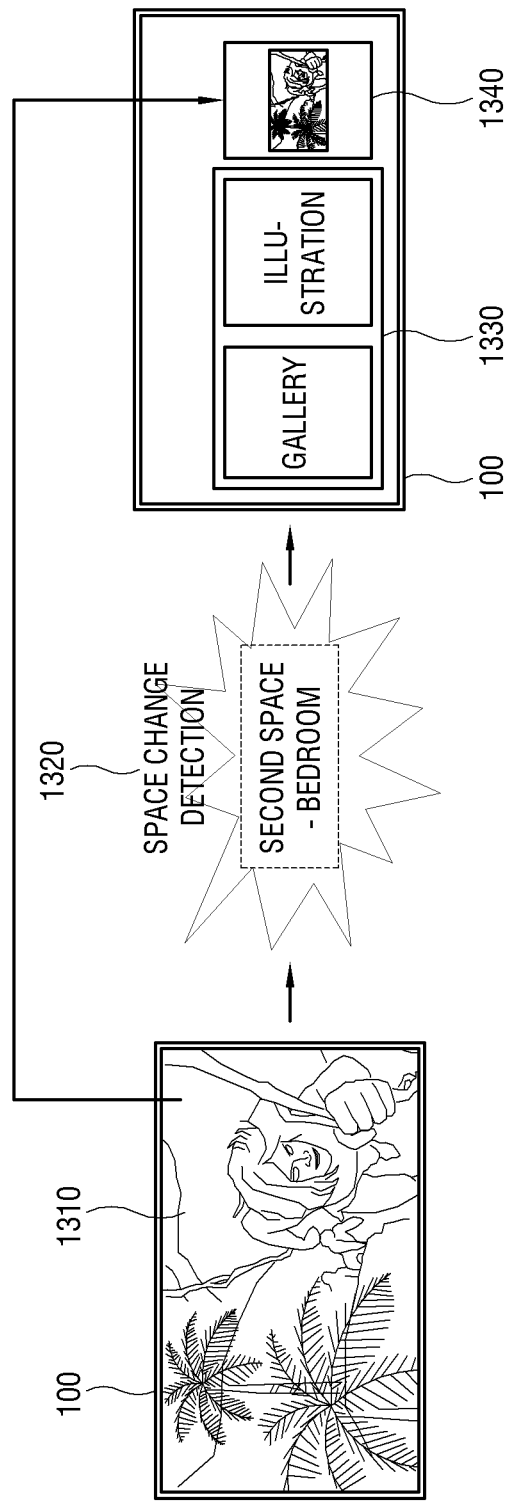
FIG. 13 is a diagram illustrating an example operation of an electronic apparatus according to various embodiments.

FIG. 13 is a diagram illustrating an example operation of an electronic apparatus according to various embodiments. The processor 190 may control the display to display an image of first content corresponding to a first space among a plurality of pieces of content based on the first space identified as the electronic apparatus 100 is located among the plurality of spaces, and display images of the first content and second content corresponding to an identified second space when it is identified that the electronic apparatus 100 is located in the second space while displaying the image of the first content.

For example, it will be assumed that a user is viewing an image 1310 through the electronic apparatus 100 in the first space, e.g., the living room. When the user picks up the electronic apparatus 100 and moves to the second space, e.g., the bedroom while viewing the image 1310, the processor 190 identifies that the electronic apparatus 100 moves from the first space to the second space 1320. The processor 190 may control the display 120 to display a second content group 1330 including at least one piece of second content corresponding to the second space as the space is changed, and, in this case, displays the image 1340 being reproduced in the first space together with the second content group 1330. Therefore, as necessary, the processor 190 may receive a user's input for switching over to a full screen to continue viewing the image, or stopping the viewing to select one of the second content group 1330.

According to an embodiment of the disclosure, a user can receive an appropriate content group even when moving between the spaces while using the electronic apparatus, thereby improving user convenience.

Figure 14:
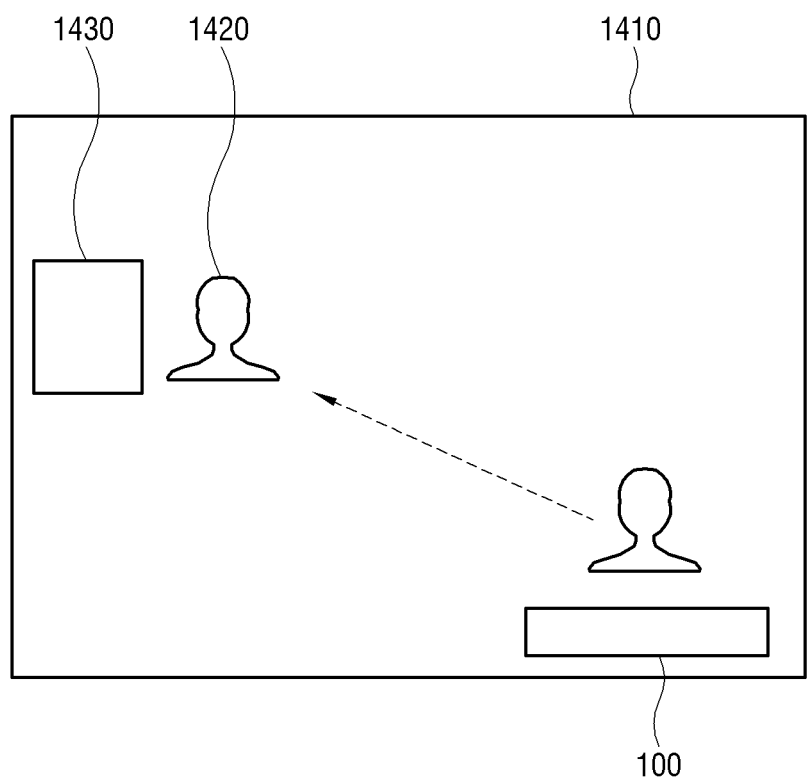
FIG. 14 is a diagram illustrating locations of an electronic apparatus and a user according to various embodiments.
Figure 15:
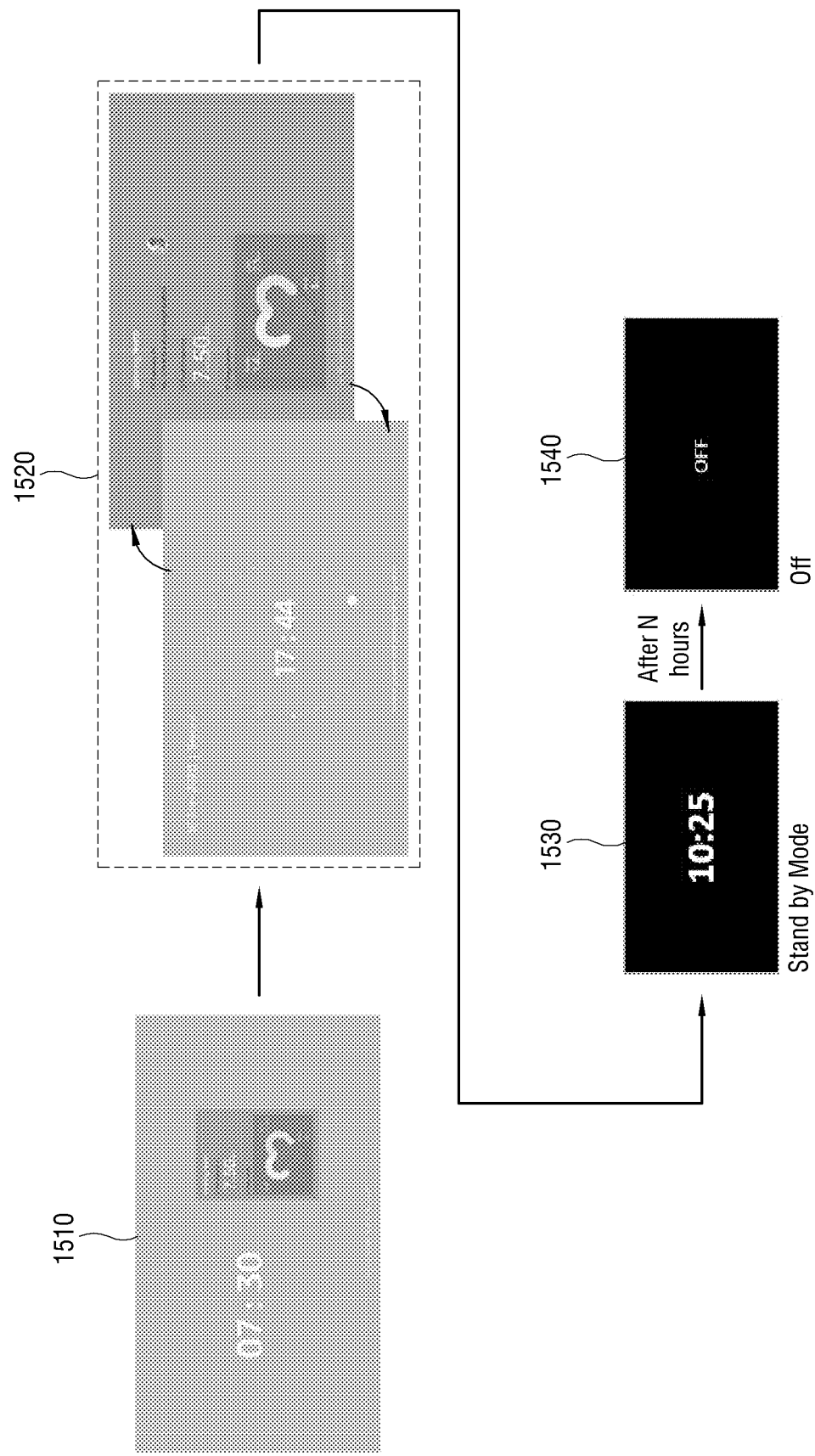
FIG. 15 is a diagram illustrating example images of a content group identified based on a locational relationship between an electronic apparatus and a user according to various embodiments.

FIG. 14 is a diagram illustrating locations of an electronic apparatus and a user according to various embodiments, and FIG. 15 is a diagram illustrating example images of a content group identified based on a locational relationship between an electronic apparatus and a user according to various embodiments. FIG. 14 shows that the electronic apparatus 100, a user 1420, and an external device 1430 are located in a space 1410. The processor 190 identifies a locational relationship between the electronic apparatus 100 and the user 1420 in the space 1410, and control the display 120 to display an image of identified content based on the identified locational relationship between the electronic apparatus 100 and the user 1420. In greater detail, the processor 190 may control the display 120 to display the image of the identified content based on a distance between the electronic apparatus 100 and the user 1420.

For example, when the user 1420 is closer to the electronic apparatus 100 than a previously defined distance, the processor 190 may display a content group corresponding to the space 1410 like an image 1510 of FIG. 15. In FIG. 15, the content group of the image 1510 includes a widget showing a clock, and a widget showing a health condition. In addition, when a user 1420 moves toward the external device 1430 away from the electronic apparatus 100, the processor 190 may switch from the image 1510 showing both the widget for the clock and the widget for the health condition over to a full screen for each widget, and display an image 1520 while switching the full screens one by one. Therefore, the processor 190 may additionally display appended information while switching over to the full screen so that the user 1420 can check information through the full screen at a glance even when moving away from the electronic apparatus 100. In the image 1520, the size of each widget may be increased to display more detailed information. For example, the widget for the clock in the image 1510 shows only the current time, whereas the image 1520 additionally shows date, country, time in units of seconds. Further, in the case of the widget for the health condition, the image 1510 shows a total sleep time and a sleep state, but the image 1520 may additionally show a yesterday's bedtime.

Besides, the processor 190 may switch over to the image 1520 when it is identified based on the image sensing that a user disappears or a user's gaze does not look at the electronic apparatus 100.

Further, when the user 1420 is detected by the electronic apparatus located in a space other than the space 1410, or the user is not detected in that space 1410, the processor 190 may display an image 1530 by entering a standby mode, or turn off the power for the image 1540 when the standby mode continues.

According to various example embodiments of the disclosure, the electronic apparatus 100 may identify a user's state, identify its location in the same space as the user, and identify whether the user intends to use the electronic apparatus 100, thereby controlling operations as necessary to reduce power consumption or performing an efficiently operation.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A movable electronic apparatus comprising:
a display;
a memory;
at least one processor including processing circuitry operatively connected to the plurality of cameras, the display, and the memory,
wherein the memory stores instructions that, when executed by the at least one processor, cause the at least one processor to:
identify that the electronic apparatus is located in a first room among a plurality of rooms,
identify surrounding environments of the first room,
control the display to display an image of a first content group among a plurality of pieces of content, wherein the first content group includes at least one piece of first content corresponding to one or more user activities or user interests related to the first room, the image of the first content group including a background image identified based on the identified surrounding environments,
identify that the electronic apparatus moves from the first room to a second room,
identify surrounding environments of the second room, and
control the display to display an image of a second content group including at least one piece of second content corresponding to one or more user activities or user interests related to the second room, the image of the second content group including a background image identified based on the identified surrounding environments.

2. The electronic apparatus of claim 1, wherein the processor is configured to: obtain information about a room where the electronic apparatus is located; and
identify that the electronic apparatus moves from the first room to the second room based on the obtained information and reference information set corresponding to the plurality of rooms.

3. The electronic apparatus of claim 2, wherein the processor is configured to:
control the display to display a graphic user interface (GUI) for setting the reference information;

receive an input for setting the reference information through the displayed GUI; and set the reference information based on the received input.

4. The electronic apparatus of claim 1, wherein the processor is configured to: identify a user using the electronic apparatus among a plurality of users; and identify the content group corresponding to the identified user.

5. The electronic apparatus of claim 1, wherein the processor is configured to:

identify an external device located within a specified proximity of the electronic apparatus; and identify a room where the electronic apparatus is located based on a matching relationship between the identified external device and the plurality of rooms.

6. The electronic apparatus of claim 1, wherein the processor is configured to: identify a moving distance of the electronic apparatus; and identify a room where the electronic apparatus is located based on the identified moving distance.

7. The electronic apparatus of claim 1, wherein the processor is configured to:

control the display to display a GUI for selecting any one among the plurality of rooms;

receive an input for selecting a room where the electronic apparatus is located through the displayed GUI; and identify a room where the electronic apparatus is located based on the received input.

8. The electronic apparatus of claim 1, wherein the processor is configured to identify a content group corresponding to the identified room based on priority of content previously defined according to the plurality of rooms.

9. The electronic apparatus of claim 1, wherein the processor is configured to:

identify a surrounding environment of the identified room; and control the display to display an image of the identified content group based on the identified surrounding environment.

10. The electronic apparatus of claim 9, wherein the processor is configured to control the display to provide a GUI through which settings for an external device provided in the room may be changed based on the identified surrounding environment.

11. The electronic apparatus of claim 1, wherein the processor is configured to:

identify a use history of the electronic apparatus; and identify a content group corresponding to the identified room based on the identified use history of the electronic apparatus.

12. The electronic apparatus of claim 1, wherein the processor is configured to control the display to display:

an image of first content corresponding to a first room identified as being the room in which the electronic apparatus is located among a plurality of pieces of content based on the identified first room among the plurality of rooms; and the image of the first content and an image of a second content group corresponding to a second room, upon identifying that the electronic apparatus is located in the second room while displaying the image of the first content.

13. The electronic apparatus of claim 1, wherein the processor is configured to:

identify a locational relationship between the electronic apparatus and a user within the identified room; and control the display to display an image of the identified content group based on the identified locational relationship between the electronic apparatus and the user.

14. The electronic apparatus of claim 13, wherein the processor is configured to control the display to display an image of the identified content group based on a distance between the electronic apparatus and the user.

15. A method of controlling a movable electronic apparatus, the method comprising:

identifying that the electronic apparatus is located in a first room among a plurality of rooms;

identifying surrounding environments of the first room, displaying an image of a first content group among a plurality of pieces of content, wherein the first content group includes at least one piece of first content corresponding to one or more user activities or user interests related to the first room, the image of the first content group including a background image identified based on the identified surrounding environments;

identifying that the electronic apparatus moves from the first room to a second room;

identifying surrounding environments of the second room, and displaying an image of a second content group including at least one piece of second content corresponding to one or more user activities or user interests related to the second room, the image of the second content group including a background image identified based on the identified surrounding environments.

* * * * *